United States Patent

Fukayama et al.

Patent Number: 4,593,065
Date of Patent: Jun. 3, 1986

[54] ORGANOPOLYSILOXANE COMPOSITION PAINTABLE AFTER ROOM TEMPERATURE CURING

[75] Inventors: Miyoji Fukayama; Masayuki Onishi, both of Chiba, Japan

[73] Assignee: Toray Silicone Company, Ltd., Tokyo, Japan

[21] Appl. No.: 764,141

[22] Filed: Aug. 9, 1985

[30] Foreign Application Priority Data

Aug. 16, 1984 [JP] Japan .................... 59-170865

[51] Int. Cl.$^4$ ............................. C08L 83/04
[52] U.S. Cl. ....................... 524/860; 528/33; 528/34; 528/37; 528/38; 528/41
[58] Field of Search ............ 528/33, 34, 37, 38, 528/41; 524/860

[56] References Cited

U.S. PATENT DOCUMENTS

| | | | |
|---|---|---|---|
| 4,323,489 | 4/1982 | Beers | 528/33 |
| 4,447,576 | 5/1984 | Fukayama et al. | 524/714 |
| 4,515,932 | 5/1985 | Chung | 528/16 |
| 4,528,353 | 7/1985 | Lucas | 528/33 |

Primary Examiner—Melvyn I. Marquis
Attorney, Agent, or Firm—Roger H. Borrousch

[57] ABSTRACT

Room temperature curing organopolysiloxane composition which are paintable after curing can be made by mixing hydroxyl-terminated organopolysiloxane, a paintability compound which contains at least one X—R$^1$—O— silicon-bonded group and at least one aminoxy or amido group bonded to a silicon atom where X is

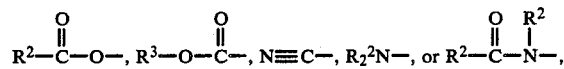

and R$^1$ is a divalent hydrocarbon group, and a crosslinking compound which is a silicon compound having at least two silicon-bonded aminoxy and amido groups. These compositions can cure to low modulus sealing materials useful in building construction and by being paintable allow the color to be determined after installation rather than needing to select a pre-pigmented composition.

20 Claims, No Drawings

ORGANOPOLYSILOXANE COMPOSITION PAINTABLE AFTER ROOM TEMPERATURE CURING

BACKGROUND OF THE INVENTION

1. Technical Field of the Invention

The present invention describes a room temperature-curable organopolysiloxane composition. More specifically, the present invention describes a room temperature-curable organopolysiloxane composition wherein the surface of the silicone rubber, after curing at room temperature, is readily painted.

2. Prior Art Technologies and Their Drawbacks

It is known in the prior art that the entire composition is cured into a rubbery elastomer at room temperature by the reaction of a hydroxyl-terminated organopolysiloxane with an amide group-containing organosilicon compound or an aminoxy group-containing organosilicon compound as the curing agent. Such compositions can also employ bifunctional compounds and polyfunctional compounds with $\geq 3$ functional groups as the curing agent. Their ratios are varied in order to vary the properties over a broad range from low modulus-high ductility to high modulus-low ductility. In particular, a low modulus-high ductility composition is used as a construction sealing material because organopolysiloxanes exhibit excellent weather resistance and fatigue resistance.

However, silicone sealing materials suffer the significant drawback that the surface of the cured silicone rubber either cannot be painted or is painted with difficulty because the paint will not coat or will not adhere (this definition applies below). Due to this drawback, limitations are imposed on the applications of silicone sealing materials although they exhibit excellent properties.

Various methods were examined by the present inventors in order to improve upon this drawback to the paintability of silicone sealing materials. A method was proposed by Fukayama in U.S. Pat. No. 4,447,576, issued May 8, 1984, in which an organopolysiloxane composition curing by displacement of aminoxy or amido groups is combined with an alcohol containing a specific functional group.

However, the above method is generally executed in a 3-package configuration. In particular, because the alcohol containing a specific functional group and comprising the third component is present in extremely small quantities, the paintability and physical properties will vary significantly due to errors in blending at the time of use or due to small differences in the quantity remaining in the container after addition. In addition, the composition to which the prescribed quantity of the third component has, in fact, been added results in nonuniform product and presents the drawback that the individual parts of the molding have an inhomogeneous paintability or inhomogeneous physical properties.

On the other hand, when the quantity of said alcohol containing a specific functional group is increased in order to increase the paintability, the properties of the composition are degraded because the interior of the composition exhibits poor curability. For this reason, the prior art compositions have the drawback of an incompatibility between the desired paintability and the desired physical properties.

3. Goal of the Invention

The goal of the present invention is to eliminate the above-mentioned drawbacks by providing an organopolysiloxane composition which is paintable after curing at room temperature.

SUMMARY OF THE INVENTION

The preceding goal of the present invention is accomplished with an organopolysiloxane composition paintable after room temperature curing, comprising a product obtained by mixing (A) 100 parts by weight hydroxyl-group terminated organopolysiloxane having a viscosity at 25° C. of 0.02 to 1,000 Pa.s, the organic groups of said organopolysiloxane being monovalent groups selected from the group consisting of hydrocarbon groups, halogenated hydrocarbon groups and cyanoalkyl groups, (B) a paintability compound which is an organosilicon compound possessing in each molecule at least one group with the general formula X—R$^1$—O— directly bonded to a silicon atom, also possessing in each molecule at least one aminoxy or amido group directly bonded to a silicon atom, any remaining valences of silicon atoms in each molecule not satisfied by X—R$^1$—O—, aminoxy, and amido are satisfied by divalent oxygen atoms linking silicon atoms together or by monovalent groups selected from the groups consisting of hydrocarbon groups, halogenated hydrocarbon groups, and cyanoalkyl groups, in the formula X—R$^1$—O—, X is selected from the group consisting of

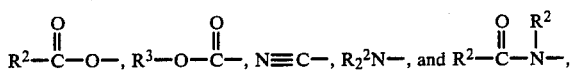

where R$^1$ is a divalent hydrocarbon group, R$^3$ is a monovalent hydrocarbon group, R$^2$ is a monovalent hydrocarbon group or a hydrogen atom, (B) being present in a quantity such that there is from 0.01 to 10 parts by weight X groups per 100 parts by weight of (A), (C) sufficient crosslinking compound necessary to cure this composition, said crosslinking compound being a silicon compound possessing in each molecule at least two groups directly bonded to silicon atoms selected from the group consisting of aminoxy groups and amido groups, any remaining valences of silicon atoms not satisfied by aminoxy and amido are satisfied by divalent oxygen atoms linking silicon atoms together, by monovalent groups selected from the group consisting of hydrocarbon groups, halogenated hydrocarbon groups, and cyanoalkyl groups, and by X—R$^1$—O— groups; when X—R$^1$—O— groups are present one compound can function both as (B) and (C) provided there is a total of at least two aminoxy and amido groups per molecule.

DETAILED DESCRIPTION OF THE INVENTION

Component (A) used in this invention is the base material for the present composition and is a hydroxyl group-terminated organopolysiloxane. An advantageous example of said organopolysiloxane is the α,ω-dihydroxypolydiorganosiloxane with the general formula HO(R$_2$SiO)$_n$H where the R's may or may not be identical and are monovalent hydrocarbon groups, monovalent halogenated hydrocarbon groups, or cyanoalkyl groups and n is such that the viscosity of said organopolysiloxane is 0.02 to 1,000 Pa.s at 25° C.; however, the straight chain may be branched in part so $\geq 3$ hydroxyl groups may be present in each molecule. Examples of R are monovalent hydrocarbon groups such as alkyl groups such as methyl, ethyl, propyl, and octyl; alkenyl groups such as vinyl and allyl; aryl groups such as phenyl and tolyl; and monovalent halogenated hydrocarbon groups such as chloromethyl and 3,3,3-trifluoropropyl; and cyanoalkyl groups such as cyanoethyl. At least 70% of R is preferably methyl from the standpoint of ease of synthesis and the balance between the desired post-cure mechanical properties and the appropriate composition viscosity. Furthermore, preferably all groups are methyl. When the organopolysiloxane has a viscosity <0.02 Pa.s, the rubbery elastomeric cured product will not exhibit excellent physical properties, particularly good softness or high elongation. On the other hand, when the organopolysiloxane has a viscosity >1,000 Pa.s, the resulting composition will have an increased viscosity and will exhibit a significant reduction in its workability during application. Due to this, the viscosity must be 0.02 to 1,000 Pa.s and preferably 0.2 to 200 Pa.s.

The component (B) used in this invention is the essential component for imparting paintability in the surface of the silicone rubber which has been cured at room temperature. It is a paintability compound which is an organosilicon compound possessing in each molecule at least 1 silicon group with the general formula X—R$^1$—O— directly bonded to a silicon atom and possessing in each molecule at least 1 aminoxy or amido group directly bonded to a silicon atom. The aminoxy group is the group with the general formula R$_2^2$NO—, the amido group is the group with the general formula R$^2$—C(=O)—NR$^2$— and X in the preceding formula is a group selected from $$R^2{-}\overset{\overset{\displaystyle O}{\|}}{C}{-}O{-},\ R^3{-}O{-}\overset{\overset{\displaystyle O}{\|}}{C}{-},\ N{\equiv}C{-},\ R_2^2N{-},\ \text{and}$$

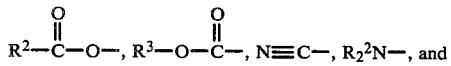

R$^1$ is a divalent hydrocarbon group and examples thereof are alkylene groups such as —CH$_2$—, —CH$_2$CH$_2$—, —CH$_2$CH$_2$CH$_2$—, —CH$_2$CH(CH$_3$)CH$_2$—, and —(CH$_2$)$_4$—; substituted alkylene groups such as —CH$_2$—CH(CH=CH$_2$)—CH$_2$—; and alkylenearylene groups such as —C$_6$H$_4$—CH$_2$—. R$^2$ is a hydrogen atom and/or a monovalent hydrocarbon group. Examples of these monovalent hydrocarbon groups are alkyl groups such as methyl, ethyl, propyl, and butyl; aralkyl groups such as 2-phenylethyl and 2-phenylpropyl; aryl groups such as phenyl, tolyl, and xylyl; and alkenyl groups such as vinyl, allyl, and propenyl. R$^3$ is also a monovalent hydrocarbon group, for which the examples are the same as those described for R$^2$, with the exception of the hydrogen atom. Examples of R$^2$—C(=O)—O— are

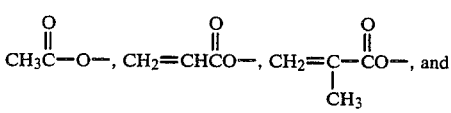

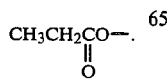

Examples of R$^3$—O—C(=O)— are

Examples of $$R_2^2N{-}$$

are

Examples of $$R_2^2NO{-}$$

are

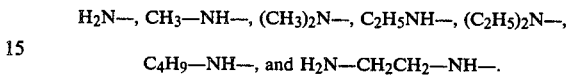

Examples of

are

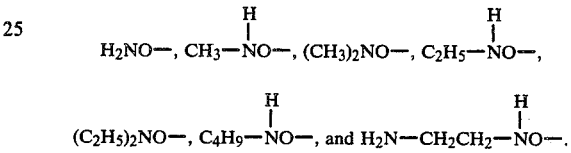

Examples of component (B) are aminoxysilanes such as

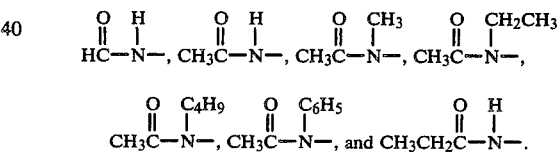

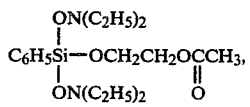

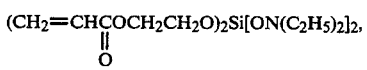

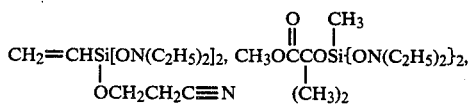

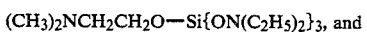

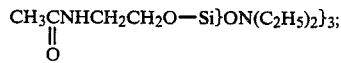

aminoxysiloxanes such as

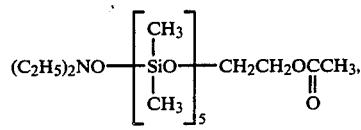
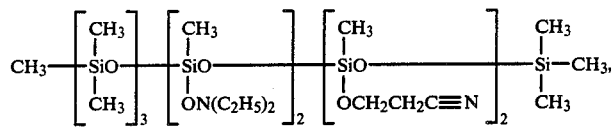
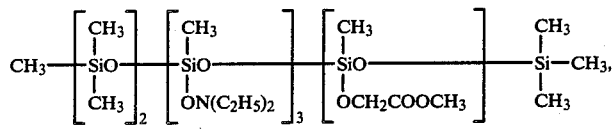
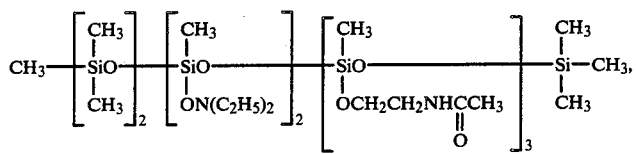
and
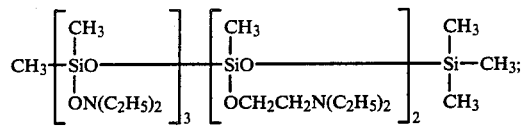
aminoxycyclosiloxanes such as
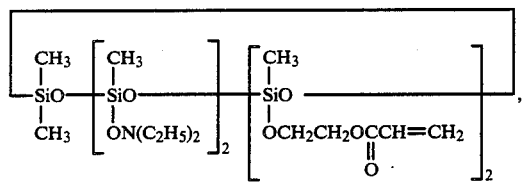
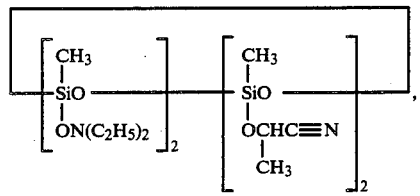
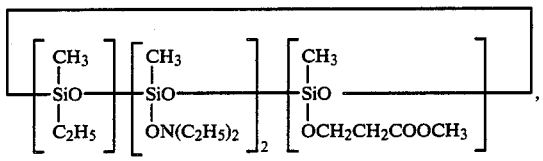
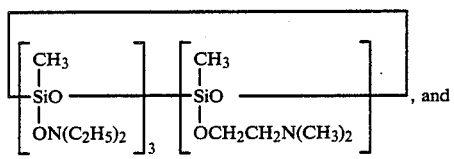
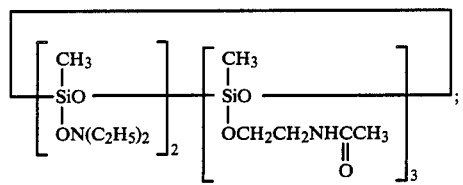
amidosilanes such as
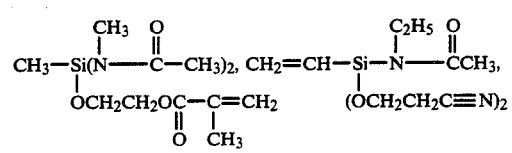
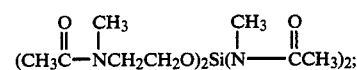
amidosiloxanes such as
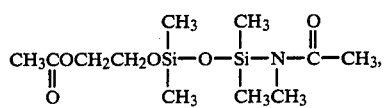
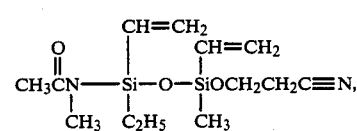

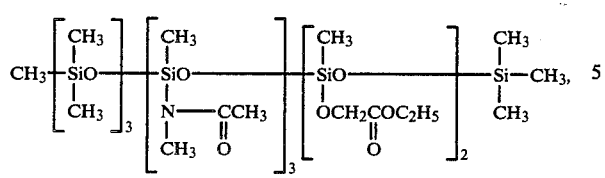

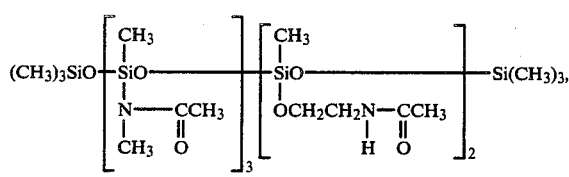

and

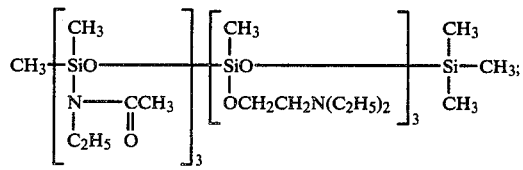

and amidocyclosiloxanes such as

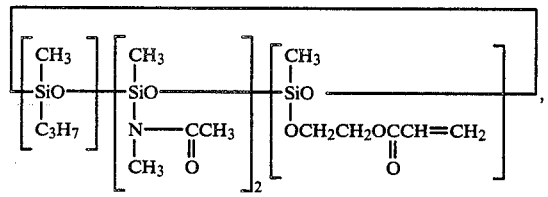

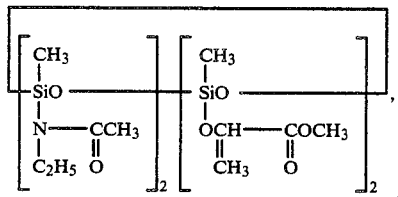

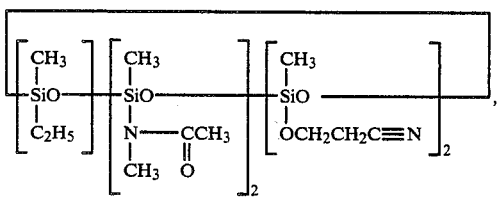

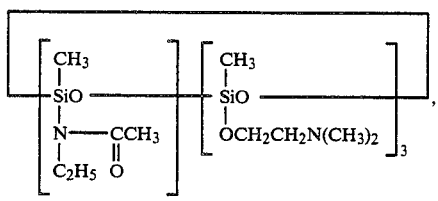

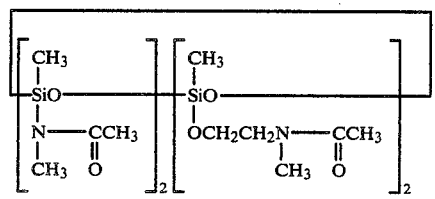

The preceding component may be produced by reacting an aminoxy and/or amido group-containing organosilicon compound with an X group-containing alcohol compound at 20° to 50° C. and removing the hydroxylamine and/or amide by-product as necessary.

The quantity of addition of component (B) is determined by the condition that 0.01 to 10 parts by weight and preferably 0.1 to 5 parts by weight of total X group in component (B) are present per 100 parts by weight of component (A). When this quantity falls below the above range, the resulting cured composition has an inadequate paintability in practice. On the other hand, when this quantity exceeds the above range, this is disadvantageous because it is uneconomical.

The organosilicon compound comprising component (C) in the present invention is the component which reacts with the hydroxyl groups of the organopolysiloxane comprising component (A) at room temperature in the presence of moisture to give crosslinking and curing. For this reason, it must possess in each molecule at least 2 amido and/or aminoxy groups directly bonded to a silicon atom; however, when component (B) possesses in each molecule at least 2 amido and/or aminoxy groups directly bonded to a silicon atom, it may also be concurrently employed as component (C).

Examples of the amido group-containing organosilicon compounds mentioned above are amidosilanes such as dimethylbis(N-methylacetamido)silane, dimethylbis(N-ethylacetamido)silane, methylvinylbis(N-methylacetamido)silane, methylvinylbis(N-butylacetamido)silane, methyltris(N-phenylacetamido)silane, vinyltris(N-ethylacetamido)silane, and tetrakis(N-methylacetamido)silane; amidosiloxanes such as

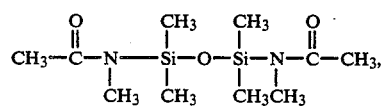

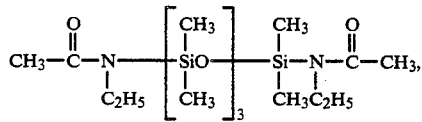

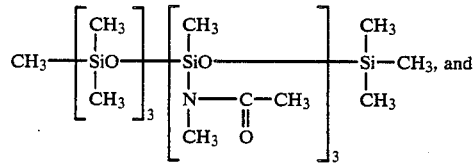

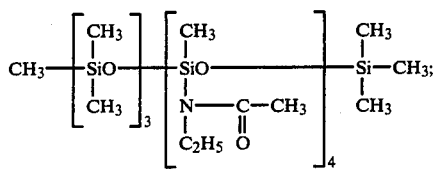

amidocyclosiloxanes such as

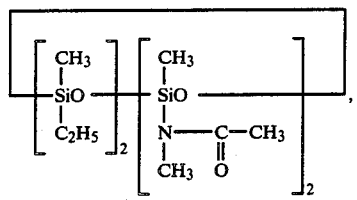

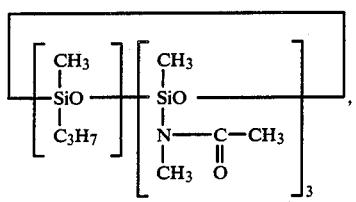

and

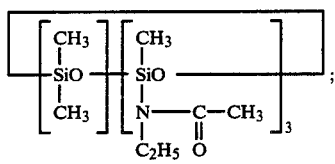

and those compounds specified for component (B) which also possess in each molecule at least 2 amido groups directly bonded to a silicon atom.

Examples of the aminoxy group-containing organosilicon compounds are aminoxysilanes such as diphenylbis(diethylaminoxy)silane, methyltris(diethylaminoxy)silane,

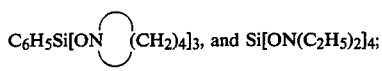

aminoxysiloxanes such as

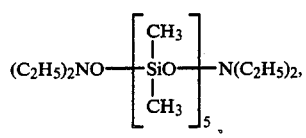

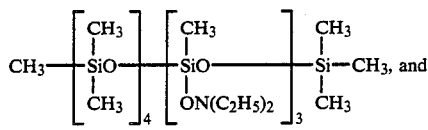

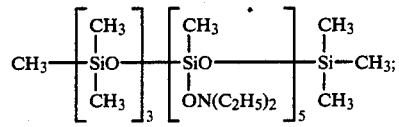

aminoxycyclosiloxanes such as

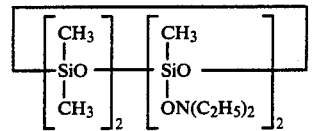

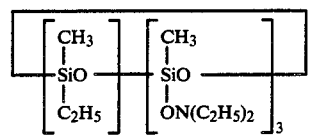

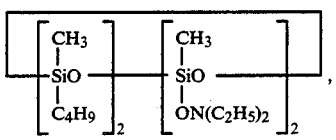

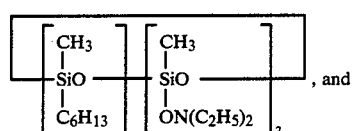

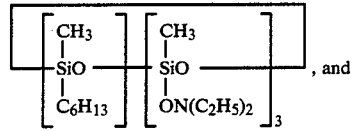

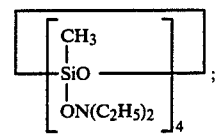

and those specified for component (B) which also possess in each molecule at least 2 aminoxy groups directly bonded to a silicon atom.

The crosslinking agent comprising component (C) is one species or two or more species selected from among the amido group-containing organosilicon compounds, aminoxy group-containing organosilicon compounds, and amido group- and aminoxy group-containing organosilicon compounds.

When a straight-chain hydroxyl group-terminated polydiorganosiloxane is employed as component (A), the crosslinking agent comprising component (C) must contain on average >2 amido and/or aminoxy groups in each molecule. On the other hand, wh en the straight chain of component (A) is branched in part and contains ≧3 hydroxyl groups, the crosslinking agent comprising component (C) must contain an average ≧2 amido and/or aminoxy groups in each molecule.

Although component (C) includes the use of only crosslinking agents which contain 3 to ≧4 amido and/or aminoxy groups in each molecule, a crosslinking agent containing 2 amido and/or aminoxy groups in each molecule is preferably mixed with a crosslinking agent containing 3 or ≧4 amido and/or aminoxy groups in each molecule. The combination of amido group functionality and aminoxy group functionality is arbitrary. However, a higher reactivity for the bifunctional component is desirable in order to achieve low modulus-high ductility and to increase the storage stability in single packaging. Because an amido group-containing organosilicon compound is generally more reactive than an aminoxy group-containing organosilicon compound, an amido group-containing organosilicon compound or aminoxy group-containing organosilicon compound is then desirably used as the trifunctional or higher functional component when the bifunctional component is an amido group-containing organosilicon compound. An aminoxy group-containing organosilicon compound is then desirably used as the trifunctional or higher functional component when an aminoxy group-containing organosilicon compound is used as the bifunctional component.

When too little component (C) is added, curing is inadequate and the storage stability is poor in single packaging. On the other hand, when this quantity is too large, the curing rate is slow and the economics may be disadvantageous. Due to this, the combined quantity of amido and/or aminoxy groups in component (C) is 0.1 to 15 parts by weight and preferably 0.3 to 10 parts by weight per 100 parts by weight of the organopolysiloxane comprising component (A).

The composition of the present invention optionally contains very finely powdered inorganic filler in addition to components (A) through (C) in order to improve the flow characteristics before curing or to provide the sealing material with the necessary mechanical properties after curing. The quantity of addition of optional inorganic filler is 5 to 500 parts by weight and preferably 20 to 300 parts by weight per 100 parts by weight component (A). Examples of the inorganic fillers are dry-process silica, wet-process silica, fine quartz powder, calcium carbonate, fumed titanium dioxide, diatomaceous earth, aluminum hydroxide, finely divided alumina, and such materials whose surfaces have been treated with silanes, silazanes, siloxane low polymers, or organic compounds. Calcium carbonate is preferred for construction sealing materials, particularly when low modulus-high ductility is required. In addition, organic solvents, antimolds, flame retardants, plasticizers, thixotropy agents, and adhesion promoters may be added to the composition of this invention.

With regard to the composition of the present invention, the prescribed quantities of components (A) through (C) are pre-mixed with each other in production for single packaging. Or, the prescribed quantities of components (B) and (C) are pre-mixed with each other in production and this is packaged separately from component (A) (that is, 2 packages) and the two materials are mixed with each other prior to use. Alternatively, the prescribed quantities of components (A) through (C) are separately packaged (that is, 3 packages) and the three components are mixed with each other prior to use. The method for mixing components (A) through (C) is arbitrary.

This invention will be explained by examples of execution. "Parts" in the examples always means "parts by weight." The following symbols are used in the examples.

$M_{50}$: tensile stress at 50% elongation
$T_{max}$: maximum tensile stress
$E_{max}$: elongation at maximum load The "paintability test" and "adhesion test" in the examples were conducted by the following methods.

Paintability Test

The composition of the present invention or a comparison example was cured into a 2.5 mm thick elastomer sheet. 5 cm square of the surface was coated with paint in a single coating using a brush. The paint repellence was then inspected: o indicates uniform coating, $\Delta$ indicates coating of 50 to 90% of the total, and X indicates coating of $\leq 40\%$.

Adhesion Test

After the paintability test, samples presenting paint repellence were coated 2 to 3 times in order to coat the whole surface to the maximum extent possible. After confirmation of satisfactory curing of the paint, 18 mm wide cellophane tape was adhered on the paint film and then peeled off in order to examine the peeling of the paint film: o indicates satisfactory adhesion of the paint film to the cured sheet, X indicates peeling with almost no resistance, and $\Delta$ indicates an intermediate score between the preceding 2 scores.

EXAMPLE 1

100 parts $\alpha,\omega$-dihydroxypolydimethylsiloxane with a viscosity at 25° C. of 4 Pa.s were blended and mixed to homogeneity with 30 parts fine, light calcium carbonate and 40 parts light calcium carbonate. 100 parts of the resulting base mixture were combined and mixed to homogeneity with 3.0 parts of the compound with the following formula as component (B)

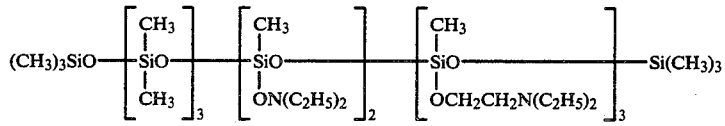

and 0.5 part of the compound with the following formula (compound I) as component (C)

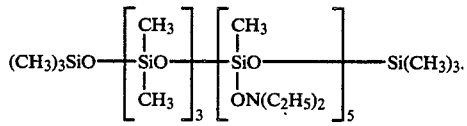

The resulting composition was molded into a 2.5 mm thick sheet and then allowed to stand at room temperature for 1 week to cure it into a rubbery elastomer. The cured product was examined by the paintability test and adhesion test. The paints were a synthetic resin emulsion paint (Vinideluxe 300 from Kansai Paint Co., Ltd.) as paint A, a polyurethane paint (Rethane No. 4000 from Kansai Paint Co., Ltd.) as paint B and an acrylic resin paint (AP Enamel from Kansai Paint Co., Ltd.) as paint C.

In addition, the composition was molded into the H-joint specified in JIS A5758 (Primer D prepared by Toray Silicone Co. was coated on glass) and this was allowed to stand at room temperature for 2 weeks and then examined by tensile testing. The results are reported in Table 1.

EXAMPLE 2

A composition was prepared as in Example 1 with the exception that component (B) was 3.0 parts of the compound with the formula

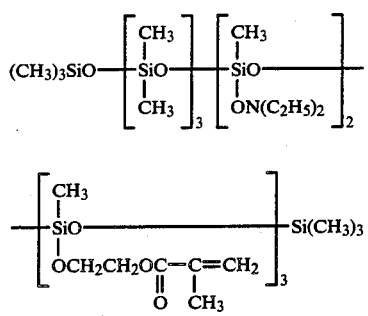

and it was then examined by the tests described in Example 1. The results are also reported in Table 1.

EXAMPLE 3

A composition was prepared as in Example 1 with the exception that component (B) was 3.0 parts of the compound with the formula

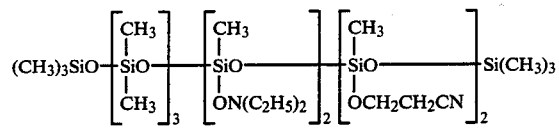

and it was then examined by the tests described in Example 1. The results are also reported in Table 1.

EXAMPLE 4

A composition was prepared as in Example 1 with the exceptions that component (B) was 4.0 parts of the compound with the formula

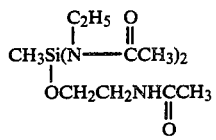

and component (C) was 1.0 part of compound I and this was then tested as described in Example 1. The results are also reported in Table 1.

EXAMPLE 5

A composition was prepared as in Example 1 with the exceptions that component (B) was 5.0 parts of the compound with the formula

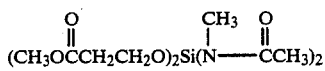

and component (C) was 1.0 part of compound I and this was then tested as described in Example 1. The results are also reported in Table 1.

COMPARISON EXAMPLE 1

100 parts of the same base mixture as in Example 1 were combined with 0.5 part compound I and 2.5 parts of the compound with the formula

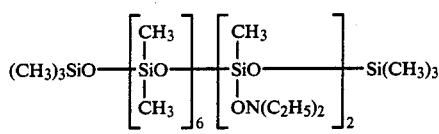

and a composition was produced therefrom by the method of Example 1. It was then tested as described in Example 1 and the results are also reported in Table 1.

EXAMPLE 6

100 parts $\alpha,\omega$-dihydroxypolydimethylsiloxane with a viscosity at 25° C. of 8 Pa.s were mixed to homogeneity with 40 parts fine, light calcium carbonate and 50 parts heavy calcium carbonate. 100 parts of the resulting base mixture were combined and mixed to homogeneity with 2.85 parts of a compound with the following formula as component (B)

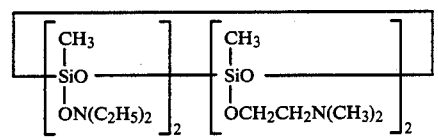

and with 0.15 part of the compound with the following formula as component (C)

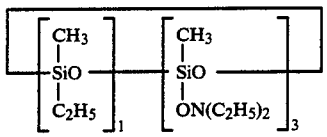

The resulting composition was cured at room temperature and then tested as described in Example 1. The results are reported in Table 2.

EXAMPLE 7

A composition was prepared as in Example 6 with the exception that component (B) was 2.85 parts of the compound with the formula

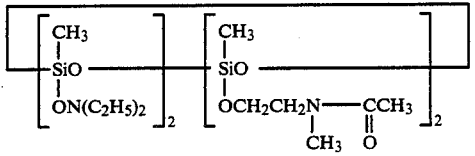

and it was then tested as described in Example 1. The results are also reported in Table 2.

EXAMPLE 8

100 parts of the base mixture of Example 6 were combined with 0.15 part of the compound with the formula

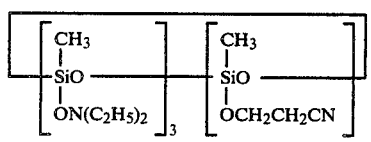

and with 2.85 parts of the compound with the formula

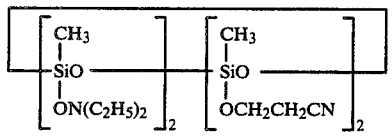

serving as both components (B) and (C). The resulting composition was tested as described in Example 1 and the results are also reported in Table 2.

EXAMPLE 9

100 parts of the same base mixture as employed in Example 6 were combined with 3.0 parts of the compound with the following formula as component (B)

$$CH_2=CHSi(N\overset{C_2H_5}{\underset{O-CH_2CH_2OCCH=CH_2}{|}}\overset{O}{\overset{\|}{CCH_3}})_2$$
$$\underset{\overset{\|}{O}}{}$$

and with 0.3 part of the compound with the following formula as component (C)

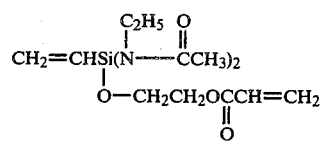

The resulting composition was tested as described in Example 1 and results are also reported in Table 2.

EXAMPLE 10

A composition was prepared as described in Example 9 with the exception that component (B) comprises 3.0 parts of the compound with the formula

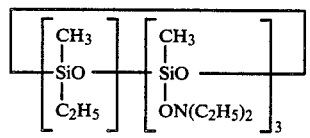

and it was then tested as described in Example 1. The results are also reported in Table 2.

COMPARISON EXAMPLE 2

100 parts of the same base mixture as in Example 6 were combined with 0.15 part of the compound with the formula

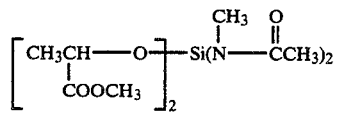

and with 2.85 parts of the compound with the formula

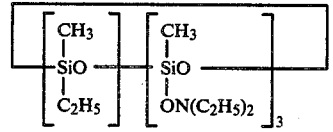

The resulting composition was tested as described in Example 1 and the results are also reported in Table 2.

EXAMPLE 11

100 parts α,ω-dihydroxypolydimethylsiloxane with a viscosity at 25° C. of 14 Pa.s were mixed to homogeneity with 30 parts fine, light calcium carbonate and 70 parts heavy calcium carbonate. 100 parts of the resulting base mixture were combined with 2 parts of component (B) and mixed to homogeneity where component (B) has the following formula

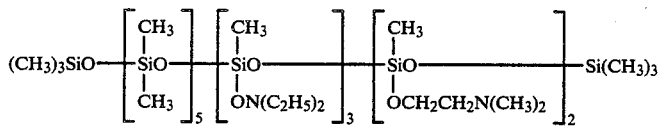

and with 6 parts dimethylbis(N-ethylacetamide)silane as component (C). The resulting composition was cured at room temperature and tested as described in Example 1 and the results are reported in Table 3.

EXAMPLE 12

A composition was produced and cured as described for the composition in Example 11 with the exception that component (B) was 2.0 parts of the compound with the formula

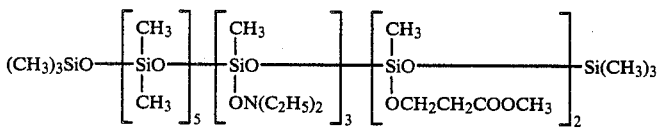

The cured product was examined by the tests described in Example 1 and the results are also reported in Table 3.

EXAMPLE 13

A composition was produced and cured as described for the composition of Example 11 with the exception that component (B) was 0.5 parts of the compound with the formula

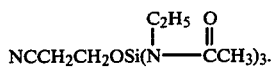

The cured product was tested as described in Example 1 and the results are also reported in Table 3.

EXAMPLE 14

100 parts of the base mixture of Example 11 were combined with 0.5 part of the compound with the following formula as component (B)

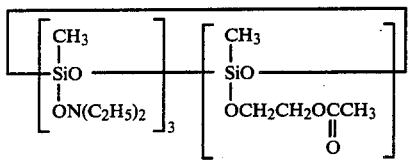

and with 6.0 parts of the compound with the following formula as component (C)

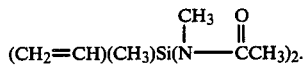

This was tested as described in Example 1 and the results are also reported in Table 3.

EXAMPLE 15

100 parts of the same base mixture as in Example 11 were combined with 6.0 parts of the compound with the formula

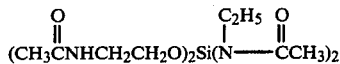

and with 0.13 part of the compound with the formula

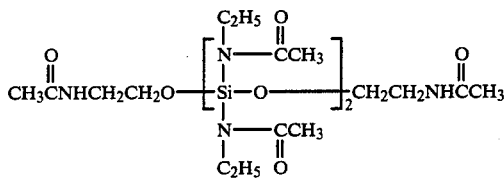

serving as both components (B) and (C). This was tested as described in Example 1 and the results are also reported in Table 3.

COMPARISON EXAMPLE 3

100 parts of the base mixture of Example 11 were combined with 6.0 parts of the compound with the formula (compound II below)

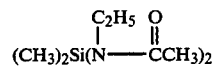

and with 2.0 parts of the compound with the formula

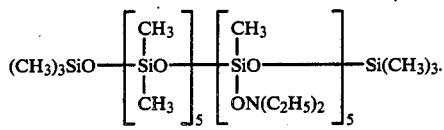

This was tested as described in Example 1 and the results are also reported in Table 3.

COMPARISON EXAMPLE 4

100 parts of the base mixture used in Example 11 were combined with 6.0 parts compound II, 2.0 parts of the compound with the formula

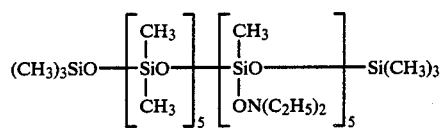

and 0.28 part dimethylaminoethanol. This was tested as described in Example 1 and the results are also reported in Table 3.

EXPLANATION OF THE EFFECTS

The composition of the present invention differs from the silicone sealing materials of the prior art and can be coated with various paints after it has cured into a rubbery elastomer. Also, it can be double packaged so one does not need to mix in a very small quantity of some component just prior to use. As a result, a silicone sealing material may be produced which exhibits stable physical properties and paintability. Due to this, the sealing material is advantageously used for sealing the outer wall joints of buildings or in special colors (thus, it is not necessary to color the sealing material) whenever paint is to be applied after application of the sealing material.

TABLE 1

| | Paint A | | Paint B | | Paint C | | $M_{50}$ (kg/cm$^2$) | $T_{max}$ (kg/cm$^2$) | $E_{max}$ (%) |
|---|---|---|---|---|---|---|---|---|---|
| | paint-ability | adhesion | paint-ability | adhesion | paint-ability | adhesion | | | |
| Example 1 | o | o | o | o | o | o | 2.0 | 10.2 | 780 |
| Example 2 | Δ | o | o | o | o | o | 2.2 | 11.5 | 690 |
| Example 3 | o | o | o | o | o | o | 3.5 | 12.6 | 370 |
| Example 4 | Δ | o | o | o | o | o | 1.5 | 4.8 | 970 |
| Example 5 | Δ | o | o | o | o | o | 1.3 | 4.2 | 1040 |
| Comparison Example 1 | x | x | o | Δ | o | x | 1.8 | 8.6 | 810 |

TABLE 2

| | Paint A | | Paint B | | Paint C | | $M_{50}$ (kg/cm$^2$) | $T_{max}$ (kg/cm$^2$) | $E_{max}$ (%) |
|---|---|---|---|---|---|---|---|---|---|
| | paintability | adhesion | paintability | adhesion | paintability | adhesion | | | |
| Example 6 | o | o | o | o | o | o | 1.5 | 9.8 | 1280 |
| Example 7 | Δ | o | o | o | o | o | 1.8 | 10.9 | 1120 |
| Example 8 | o | o | o | o | o | o | 1.3 | 9.2 | 1210 |
| Example 9 | Δ | o | o | o | o | o | 2.1 | 3.5 | 1140 |
| Example 10 | Δ | o | o | o | o | o | 1.7 | 3.2 | 1020 |
| Comparison Example 2 | x | x | o | x | o | x | 1.6 | 7.9 | 1130 |

TABLE 3

| | Paint A | | Paint B | | Paint C | | $M_{50}$ (kg/cm$^2$) | $T_{max}$ (kg/cm$^2$) | $E_{max}$ (%) |
|---|---|---|---|---|---|---|---|---|---|
| | paintability | adhesion | paintability | adhesion | paintability | adhesion | | | |
| Example 11 | o | o | o | o | o | o | 1.0 | 2.7 | 970 |
| Example 12 | Δ | o | o | o | o | o | 0.9 | 2.5 | 830 |
| Example 13 | Δ | o | o | o | o | Δ | 1.9 | 4.6 | 770 |
| Example 14 | Δ | o | o | o | o | o | 3.1 | 4.2 | 320 |
| Example 15 | o | o | o | o | o | o | 2.5 | 6.8 | 490 |
| Comparison Example 3 | x | x | o | Δ | o | x | 1.4 | 4.3 | 960 |
| Comparison Example 4 | Δ | Δ | o | o | o | Δ | 0.3 | 0.8 | 520 |

That which is claimed is:

1. An organopolysiloxane composition paintable after room temperature curing comprising a product obtained by mixing (A) 100 parts by weight hydroxyl-group terminated organopolysiloxane having a viscosity at 25° C. of 0.02 to 1,000 Pa.s, the organic groups of said organopolysiloxane being monovalent groups selected from the group consisting of hydrocarbon groups, halogenated hydrocarbon groups and cyanoalkyl groups, (B) a paintability compound which is an organosilicon compound possessing in each molecule at least one group with the general formula X—R$^1$—O— directly bonded to a silicon atom, also possessing in each molecule at least one aminoxy or amido group directly bonded to a silicon atom, any remaining valences of silicon atoms in each molecule not satisfied by X—R$^1$—O—, aminoxy, and amido are satisfied by divalent oxygen atoms linking silicon atoms together or by monovalent groups selected from the group consisting of hydrocarbon groups, halogenated hydrocarbon groups, and cyanoalkyl groups, in the formula X—R$^1$—O—, X is selected from the group consisting of

where R$^1$ is a divalent hydrocarbon group, R$^3$ is a monovalent hydrocarbon group, R$^2$ is a monovalent hydrocarbon group or a hydrogen atom, (B) being present in a quantity such that there is from 0.01 to 10 parts by weight X groups per 100 parts by weight of (A), (C) sufficient crosslinking compound necessary to cure this composition, said crosslinking compound being a silicon compound possessing in each molecule at least two groups directly bonded to silicon atoms selected from the group consisting of aminoxy groups and amido groups, any remaining valences of silicon atoms not satisfied by aminoxy and amido are satisfied by divalent oxygen atoms linking silicon atoms together, by monovalent groups selected from the group consisting of hydrocarbon groups, halogenated hydrocarbon groups, and cyanoalkyl groups, and by X—R$^1$—O— groups; when X—R$^1$—O— groups are present one compound can function both as (B) and (C) provided there is a total of at least two aminoxy and amido groups per molecule.

2. The organopolysiloxane composition according to claim 1 in which the organopolysiloxane of (A) is represented by the formula HO(R$_2$SiO)$_n$H wherein R is a monovalent group selected from the group consisting of hydrocarbon groups, halogenated hydrocarbon groups, and cyanoalkyl groups, n has a value such that the viscosity at 25° C. is from 0.2 to 200 Pa.s, and at least 70 percent of the R groups are methyl, the amount of (B) present is sufficient to provide from 0.1 to 5 parts by weight X group per 100 parts by weight of (A), and (C) has greater than two amido or aminoxy groups per molecule and the amount of (C) present being sufficient to provide from 0.1 to 15 parts by weight aminoxy and amido group per 100 parts by weight of (A).

3. The organopolysiloxane composition according to claim 1 further comprising (D) from 5 to 500 parts by weight of a filler.

4. The organopolysiloxane composition according to claim 2 further comprising from 5 to 500 parts by weight of a filler.

5. The organopolysiloxane composition according to claim 4 in which the organopolysiloxane of (A) is α,ω-dihydroxypolydimethylsiloxane, (C) is an aminoxy silicon compound, and the filler of (D) is calcium carbonate in an amount of 20 to 300 parts by weight per 100 parts by weight of (A).

6. The organopolysiloxane composition according to claim 5 in which the paintability compound of (B) is

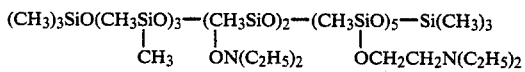

and the crosslinking compound of (C) is $$(CH_3)_3SiO(CH_3SiO)_3(CH_3SiO)_5Si(CH_3)_3$$
$$\underset{CH_3}{|} \quad \underset{ON(C_2H_5)_2}{|}$$

7. The organopolysiloxane composition according to claim 5 in which the paintability compound of (B) is $$(CH_3)_3SiO(CH_3SiO)_3(CH_3SiO)_2\text{---}(CH_3SiO)_3Si(CH_3)_3$$
$$\underset{CH_3}{|} \quad \underset{ON(C_2H_5)_2}{|} \quad \underset{\underset{O}{\overset{\|}{OCH_2CH_2OC-C=CH_2}}}{|}\underset{CH_3}{|}$$

and the crosslinking compound of (C) is $$(CH_3)_3SiO(CH_3SiO)_3(CH_3SiO)_5Si(CH_3)_3.$$
$$\underset{CH_3}{|} \quad \underset{ON(C_2H_5)_2}{|}$$

8. The organopolysiloxane composition according to claim 5 in which the paintability compound of (B) is $$(CH_3)_3SiO(CH_3SiO)_3(CH_3SiO)_2\text{---}(CH_3SiO)_2Si(CH_3)_3$$
$$\underset{CH_3}{|} \quad \underset{ON(C_2H_5)_2}{|} \quad \underset{OCH_2CH_2C\equiv N}{|}$$

and the crosslinking compound of (C) is $$(CH_3)_3SiO(CH_3SiO)_3(CH_3SiO)_5Si(CH_3)_3.$$
$$\underset{CH_3}{|} \quad \underset{ON(C_2H_5)_2}{|}$$

9. The organopolysiloxane composition according to claim 5 in which the paintability compound of (B) is $$\underset{\overset{\|}{O}}{CH_3CNHCH_2CH_2OSi}\underset{\overset{|}{CH_3}}{-}(N\text{---}\underset{\overset{\|}{O}}{CCH_3})_2$$

and the crosslinking compound of (C) is $$(CH_3)_3SiO(CH_3SiO)_3(CH_3SiO)_5Si(CH_3)_3.$$
$$\underset{CH_3}{|} \quad \underset{ON(C_2H_5)_2}{|}$$

10. The organopolysiloxane composition according to claim 5 in which the paintability compound of (B) is $$(CH_3OCCH_2CH_2O)_2Si(N\text{---}CCH_3)_2$$
$$\overset{\|}{O} \qquad \overset{|}{CH_3} \quad \overset{\|}{O}$$

and the crosslinking compound of (C) is $$(CH_3)_3SiO(CH_3SiO)_3(CH_3SiO)_5Si(CH_3)_3.$$
$$\underset{CH_3}{|} \quad \underset{ON(C_2H_5)_2}{|}$$

11. The organopolysiloxane composition according to claim 5 in which the paintability compound of (B) is $$[-(CH_3SiO)_2-(CH_3SiO)_2-]$$
$$\underset{ON(C_2H_5)_2}{|} \quad \underset{OCH_2CH_2N(CH_3)_2}{|}$$

and the crosslinking compound of (C) is $$[-(CH_3SiO)-(CH_3SiO)_3-].$$
$$\underset{CH_2CH_3}{|} \quad \underset{ON(C_2H_5)_2}{|}$$

12. The organopolysiloxane composition according to claim 5 in which the paintability compound of (B) is $$CH_2=CHCOCH_2CH_2OSi\underset{\underset{CH_2CH_3}{|}}{(N\text{---}CCH_3)_2}$$
$$\overset{\|}{O} \qquad \qquad \overset{\|}{O}$$

and the crosslinking compound of (C) is $$[-(CH_3SiO)-(CH_3SiO)_3-].$$
$$\underset{CH_2CH_3}{|} \quad \underset{ON(C_2H_5)_2}{|}$$

13. The organopolysiloxane composition according to claim 5 in which the paintability compound of (B) is $$(CH_3OC\text{---}CHO)_2Si(N\text{---}CCH_3)_2$$
$$\overset{\|}{O} \underset{CH_3}{|} \qquad \underset{CH_3}{|} \overset{\|}{O}$$

and the crosslinking compound of (C) is $$[-(CH_3SiO)-(CH_3SiO)_3-].$$
$$\underset{CH_2CH_3}{|} \quad \underset{ON(C_2H_5)_2}{|}$$

14. The organopolysiloxane composition according to claim 5 in which the paintability compound of (B) and the crosslinking compound of (C) are present in the same compounds, which are $$[-(CH_3SiO)_3-(CH_3SiO)-] \quad \text{and}$$
$$\underset{ON(C_2H_5)_2}{|} \quad \underset{OCH_2CH_2C\equiv N}{|}$$

$$[-(CH_3SiO)_2-(CH_3SiO)_2-]$$
$$\underset{ON(C_2H_5)_2}{|} \quad \underset{OCH_2CH_2C\equiv N}{|}$$

15. The organopolysiloxane composition according to claim 4 in which the organopolysiloxane of (A) is α,ω-dihydroxypolydimethylsiloxane, (C) is an amido silicon compound, and the filler (D) is calcium carbonate in an amount of 20 to 300 parts by weight per 100 parts by weight of (A).

16. The organopolysiloxane composition according to claim 15 in which the paintability compound of (B) is $$(CH_3)_3SiO(CH_3SiO)_5(CH_3SiO)_3\text{---}(CH_3SiO)_2Si(CH_3)_3$$
$$\underset{CH_3}{|} \quad \underset{ON(C_2H_5)_2}{|} \quad \underset{OCH_2CH_2N(CH_3)_2}{|}$$

and the crosslinking compound of (C) is

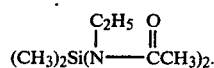

17. The organopolysiloxane composition according to claim 15 in which the paintability compound of (B) is

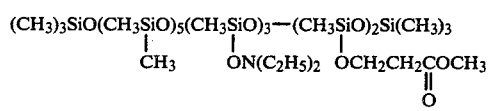

and the crosslinking compound of (C) is

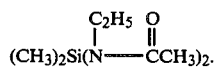

18. The organopolysiloxane composition according to claim 15 in which the paintability compound of (B) is

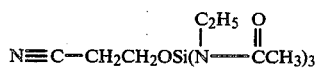

and the crosslinking compound of (C) is

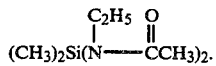

19. The organopolysiloxane composition according to claim 15 in which the paintability compound of (B) is

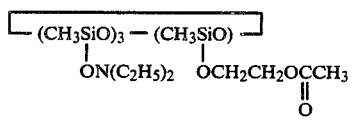

and the crosslinking compound of (C) is

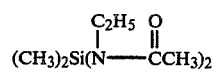

20. The organopolysiloxane composition according to claim 15 in which the paintability compound of (B) and the crosslinking compound of (C) are present in the same compounds which are

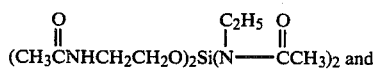

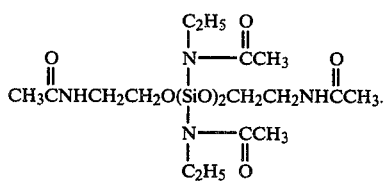

* * * * *

UNITED STATES PATENT AND TRADEMARK OFFICE
CERTIFICATE OF CORRECTION

PATENT NO. :  4,593,065
DATED      :  June 3, 1986
INVENTOR(S) :  Fukayama et al.

It is certified that error appears in the above-identified patent and that said Letters Patent is hereby corrected as shown below:

Col. 3, Line 22:  "in the surface" should read "to the surface"
Col. 4, the formula at Line 65:  should read Col. 7, the formula at Line 5:  should read

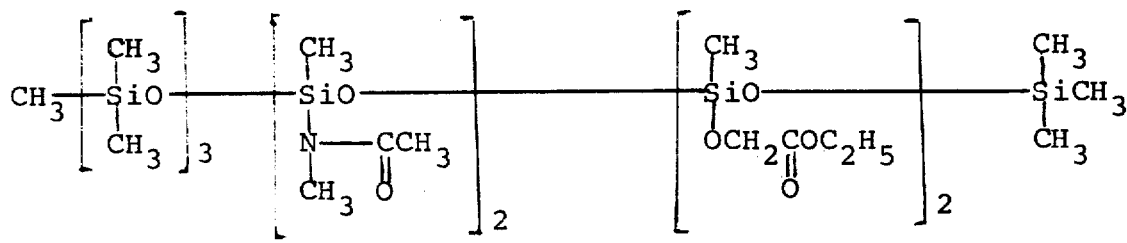

Col. 10, Line 55:  "wh en" should read "when"

Signed and Sealed this

Eleventh Day of August, 1987

*Attest:*

DONALD J. QUIGG

*Attesting Officer*      *Commissioner of Patents and Trademarks*